Jan. 30, 1951 J. M. SHEADEL 2,539,641

SHIELDING DEVICE FOR TRANSMISSION LINES

Filed March 14, 1947 2 Sheets-Sheet 1

INVENTOR.
JOHN M. SHEADEL

BY

Gordon C. Mack

Jan. 30, 1951 J. M. SHEADEL 2,539,641

SHIELDING DEVICE FOR TRANSMISSION LINES

Filed March 14, 1947 2 Sheets-Sheet 2

INVENTOR.
JOHN M. SHEADEL
BY
[signature]

Patented Jan. 30, 1951 2,539,641

UNITED STATES PATENT OFFICE 2,539,641

SHIELDING DEVICE FOR TRANSMISSION LINES

John M. Sheadel, Barberton, Ohio, assignor to The Ohio Brass Company, Mansfield, Ohio, a corporation of New Jersey Application March 14, 1947, Serial No. 734,838

7 Claims. (Cl. 174—140)

This invention relates to shielding devices for high-voltage transmission lines.

Experience in high-voltage transmission-line practice has shown that for voltages below about 230 kilovolts, line to line, there is not sufficient overstress at the clamps to produce levels of radio-influence voltage objectionable to nearby radio listeners, and the shielding devices now employed prevent flashover damage to the insulators or the conductor. However, at higher potentials—for example, with a line-to-line voltage of about 250 kilovolts or more—radio interference may be expected. The type of line hardware used—i. e., whether it has sharp corners, etc.—will control the amount of radio interference. At a line-to-line voltage of around 300 kilovolts or more there is much interference with any hardware of a standard design. Although the shielding devices of this invention are designed primarily to prevent overstresses which cause radio interference, they also shield the insulator.

The shielding devices of this invention are designed, therefore, primarily to prevent radio interference when such high voltages are employed. Although the suspension clamps, etc., may be designed with corners rounded to eliminate stresses at such higher voltages, radii of about 2 inches or more would be required for the lips, depending upon the voltage; and this is impractical. The clamp might be enclosed in a cylinder, but the parts required would be complex, and the method of assembly would be complicated, as also it would be if a ring were used below the line.

According to this invention two closed loops, preferably rings, are used to shield the line hardware, and these are mounted to face one another on opposite sides of the line. With insulator strings of the suspension type, the loops are generally mounted along each side of each clamp. For strain-type insulators, it may be preferable to mount the loops above and below the transmission line. However, as will appear from what follows, the relation of the shielding device to the line is capable of rather wide variation.

Ordinarily, the string of insulators for use with such high voltages will be so long—for example, twenty-four to thirty units of 5- to 6-inch length—that flashovers are not to be expected. Therefore, the chief purpose of the shielding devices, for the installations now contemplated, is to prevent overstresses at the points of support of high-voltage transmission lines, which without such shielding cause radio interference.

The shielding devices of this invention are designed to give easy access to the clamps, clevises or like line hardware employed at the points of support. Their structure is open so as to make bridging by ice or packing by snow unlikely. Certain forms give increased clearance from the insulators and the towers, such as may be desirable when the line is swung by a high wind. They include simple and relatively inexpensive forms of ring design and economical means of support.

For further explanation of the invention, reference is had to the accompanying drawings, in which.

Figure 9:
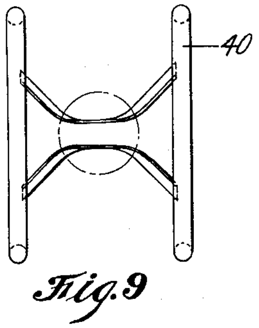
Figure 10:
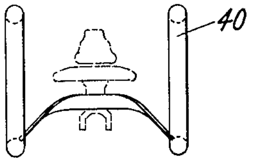
Figure 11:
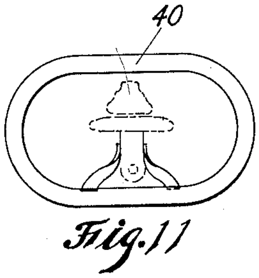
Figures 12, 13, 14:
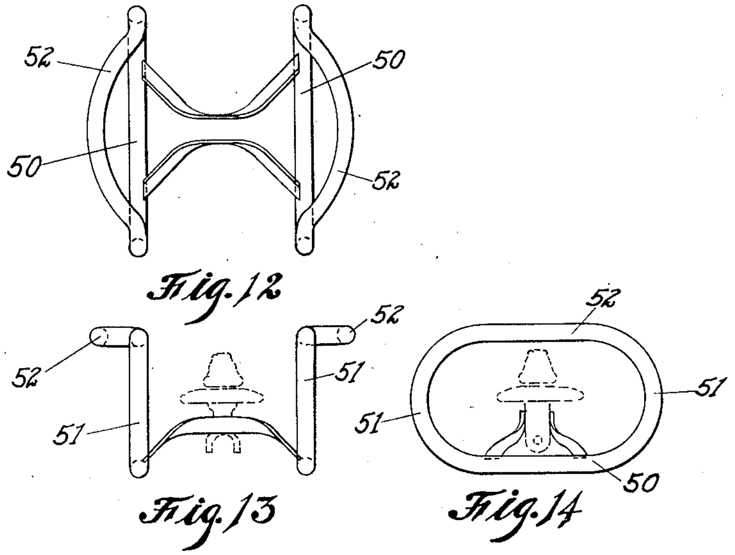

Figs. 9, 10, and 11 are, respectively, a plan, end elevation, and side elevation of a modification adapted for association with a suspension string; and Figs. 12, 13, and 14 are corresponding views of another modification.

Figure 1:
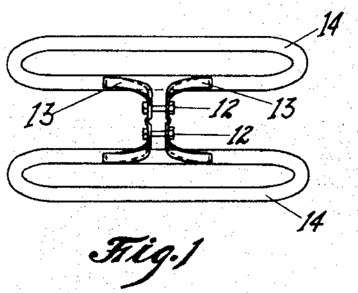
Fig. 1 is a view from above of a shielding device embodying my invention in its preferred form, as applied to a suspension string of insulators.
Figure 3:
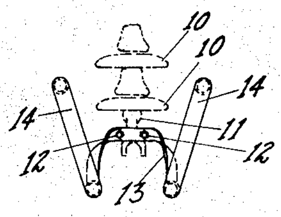
Fig. 3 is an end elevation of the device shown in Fig. 1 with a couple of the insulators shown in phantom.
Figure 2:
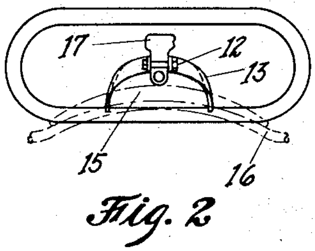
Fig. 2 is a projection of Fig. 1 on a plane at 90° from that of Fig. 1 and includes the socket eye fitting, the clamp, and transmission line.

Referring first to the embodiment shown in Figs. 1, 2, and 3, the two lowermost insulators of the suspension string are shown at 10, and the device is secured to the arcing horn socket eye 11 by clamping bolts 12 which extend through the middle portions of a pair of bracket members 13. Each bracket member has two opposite outwardly and downwardly extending arms which at their lower ends are secured, preferably by welding, to the upper faces of the lower reaches of a pair of horizontally oblong shielding rings 14. The rings are thus supported at opposite sides of and in shielding relation to the clamp 15 and high-voltage transmission line 16. The clamp is held by the socket eye fitting 17.

The rings are formed of conducting material, preferably of light weight. They may be hollow and are readily formed of pipe. They are supported with their long axes parallel with the line but with the upper portions of the rings farther apart than their lower portions, such inclination giving good clearance from the insulators and also from the tower, especially when the insulator string swings as in a high wind, and, at the same time, providing desirable proximity of the rings to the hardware.

In conjunction with these advantages, the spider-like shape and arrangement of the brackets 13 with their open, inverted U shape, as viewed in Fig. 3, are such as to give free access to the hardware from below.

By bending the ends of the connecting strap downward from the portion which fits around the socket eye fitting, the drip distance from the bottom insulator to the line hardware is increased. This discourages arcing from the outer rim of the petticoat of the line unit to the line hardware.

The open, large-clearance relation of the parts also makes the assembly relatively free from liability of fouling by ice bridging or snow packing.

Figures 4, 5:
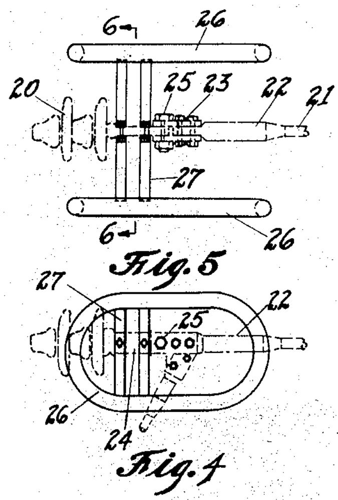
Fig. 4 is a side view of a preferred form of the invention for use with a string of strain insulators.
Fig. 5 is a plan view of the device shown in Fig. 4 with a couple of insulators shown in phantom.
Figure 6:
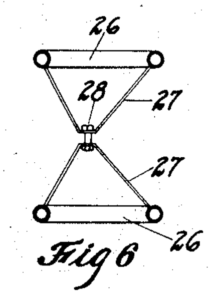
Fig. 6 is a section on the line 6—6 of the shielding device of Fig. 5 omitting the line hardware.

In the shielding device illustrated in Figs. 4–6 the insulator string 20 is of the strain type. The end of the transmission line 21 is held in the clamp 22. This clamp is held by the clevis 23 which is fastened at one end to the eye socket fitting 24 by the pin 25 about which the clevis is adapted to swivel.

The rings 26 are supported horizontally in parallel relation to each other, and each ring is supported by a pair of spaced-apart brackets 27 clamped by bolts 28 which pass through the socket eye 24.

The size and the oblong shape of the rings 26 are such that they extend horizontally in a position of shielding relation from the nearest insulator to a position near enough to the outer end of the strain clamp 22 for their shielding influence to prevent overstress at the end of the strain clamp where the line 21 fits into it.

Figure 7:
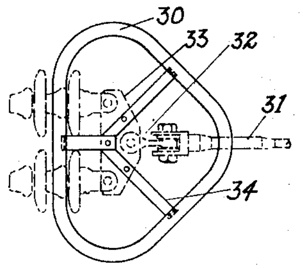
Fig. 7 is a view from above of a preferred form of the invention adapted for use with a double string of insulators of the strain type, showing a couple of insulators in phantom.
Figure 8:
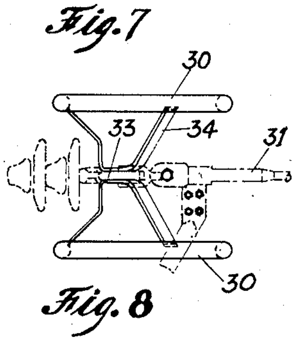
Fig. 8 is a side elevation of the device shown in Fig. 7.

A generally similar relationship is present in Figs. 7 and 8, showing a double strain assembly, except that the rings 30 are mounted horizontally above and below the line anchorage assembly, and they are approximately in the shape of a triangle with rounded corners, as shown clearly in Fig. 7, so as to have in the region of the insulators sufficient extent crosswise of the line to shield both strings of insulators and the wide yoke-plate assembly. The clamp 31 is attached through the clevis 32 to the yoke plate 33 to give desired flexibility. The yoke plate is held between the rings by the bracket 34.

Figs. 9, 10, and 11 show a modification quite similar to the preferred form of Figs. 1–3 except that the rings 40 are vertical and lie in vertical planes instead of tilting outwardly away from one another. The arrangement with the rings vertical, as shown in these figures, is quite satisfactory but is not as economical of space as the preferred arrangement of Figs. 1–3.

Figs. 12–14 show a modification of the simple arrangement shown in Figs. 9–11 which gives most of the advantages of the preferred arrangement (Figs. 1–3) but by a modified construction. As will be seen, the shields are not rings, but closed loops. The bottom reach 50 of each and the upward reaches 51 are the same as in Figs. 9–11, but the top reach 52 of each curves outward. This gives greater clearance around the string of insulators without increasing the distance of the portions 50 and 51 from the line hardware.

Further modifications in shielding units for both strain-type and suspension-type rings are possible without departing from the appended claims. Although other means of mounting may be employed, the shielding units will ordinarily be mounted at the end of the insulator string as shown. Although both rings will ordinarily be fastened together and mounted as a unit, they may be mounted separately if preferred. The size of the shielding units may vary widely. They may conveniently be made of pipe about 2 inches in diameter and in their greatest dimension may measure up to 30 or 40 or more inches. The dimensions of the units will depend upon the voltage of the line, etc.

What I claim is:

1. In combination with a transmission line adapted to operate at a line-to-line voltage of at least about 250 kilovolts, means supporting the line which includes insulating means metallic means connecting the line with the insulating means, and fastened to the supporting means a shielding device which includes two closed-loop shielding portions held to the supporting means by means which holds the loop portions facing one another on opposite sides of the line in planes generally parallel to the line with said metallic means between them.

2. The combination of claim 1 in which the bottoms of the loop portions are closer together than the top portions.

3. The combination of claim 1 in which the holding means is composed of two members, each being generally the shape of an inverted U, the members being held against opposite sides of the supporting means with each member bridging the line.

4. The combination of claim 1 in which the loop portions are elongated with the longest dimension of each substantially parallel to the transmission line.

5. A shielding device for a transmission line adapted to operate at a line-to-line voltage of at least about 250 kilovolts, which includes two separate loop-shaped portions with U-shaped means adapted to bridge the line and its ends fastened to the respective loop-shaped portions and holding them facing one another with the U-shaped means between them, and generally parallel to a line passed between them.

6. The shielding device of claim 5 in which the loops are hollow and each lies in a single plane with the portions to which the U-shaped means are fastened closer to one another than any other two portions of the loops.

7. The shielding device of claim 5 in which each loop is generally flat and elongated, with the ends of the U-shaped means fastened at about the middle of one of the long sides of each loop, which sides are closer to one another than any other two portions of the loops.

JOHN M. SHEADEL.

REFERENCES CITED

The following references are of record in the file of this patent:

UNITED STATES PATENTS

| Number | Name | Date |
|---|---|---|
| 1,695,892 | Fortescue | Dec. 18, 1928 |
| 1,741,333 | Peek | Dec. 31, 1929 |
| 1,799,977 | Fortescue | Apr. 7, 1931 |
| 1,802,743 | Wahlberg | Apr. 28, 1931 |
| 1,813,157 | Eaton | July 7, 1931 |
| 1,836,999 | Wahlberg | Dec. 15, 1931 |
| 1,870,781 | Miller | Aug. 9, 1932 |
| 2,095,311 | Burleson | Oct. 12, 1937 |
| 2,232,665 | Ruoff | Feb. 18, 1941 |

FOREIGN PATENTS

| Number | Country | Date |
|---|---|---|
| 391,048 | England | Apr. 20, 1933 |